US012730362B2

(12) United States Patent
She et al.

(10) Patent No.: US 12,730,362 B2
(45) Date of Patent: Sep. 8, 2026

(54) PAN-TILT, METHOD FOR CONTROLLING PAN-TILT, AND PHOTOGRAPHING APPARATUS

(71) Applicant: Hangzhou SuperAcme Electronics Technology Co., Ltd., Hangzhou (CN)

(72) Inventors: Chenyu She, Hangzhou (CN); Guo Ai, Hangzhou (CN); Zuoxing Yang, Hangzhou (CN)

(73) Assignee: HANGZHOU SUPERACME ELECTRONICS TECHNOLOGY CO., LTD., Hangzhou Zhejiang (CN)

( * ) Notice: Subject to any disclaimer, the term of this patent is extended or adjusted under 35 U.S.C. 154(b) by 185 days.

(21) Appl. No.: 18/697,952

(22) PCT Filed: Aug. 31, 2023

(86) PCT No.: PCT/CN2023/116070
§ 371 (c)(1),
(2) Date: Apr. 2, 2024

(87) PCT Pub. No.: WO2024/051568
PCT Pub. Date: Mar. 14, 2024

(65) Prior Publication Data

US 2025/0013127 A1 Jan. 9, 2025

(30) Foreign Application Priority Data

Sep. 5, 2022 (CN) ......................... 202211077749.7

(51) Int. Cl.
*G03B 17/56* (2021.01)
*F16M 11/12* (2006.01)

(52) U.S. Cl.
CPC ......... *G03B 17/561* (2013.01); *F16M 11/126* (2013.01)

(58) Field of Classification Search
CPC ................. G01P 3/49; G01P 3/46–465; F16M 11/043–128; G03B 17/56–566
(Continued)

(56) References Cited

U.S. PATENT DOCUMENTS 3,796,899 A * 3/1974 Giachello ............. H01F 13/003 310/156.32
4,831,380 A * 5/1989 Gimblett ................ G01D 3/022 341/142
(Continued)

FOREIGN PATENT DOCUMENTS

CN 101063510 A 10/2007
CN 107526373 A 12/2017
(Continued)

OTHER PUBLICATIONS

Ling et al, University Physics vol. 2, Chapter 13.3 “Motional Emf”. OpenStax, 2016. Archive.org dated May 11, 2021 from https://pressbooks.online.ucf.edu/osuniversityphysics2/chapter/motional-emf/ (Year: 2016).*

(Continued)

*Primary Examiner* — Leon W Rhodes, Jr.
(74) *Attorney, Agent, or Firm* — Dickinson Wright PLLC

(57) ABSTRACT

Embodiments of this application provide a pan-tilt, a method for controlling a pan-tilt, and a photographing apparatus. A magnetic-field generating apparatus for generating uniform detection magnetic field is mounted on a pan-tilt base of the pan-tilt, a conductor rod is mounted on a pan-tilt head of the pan-tilt, and two ends of the conductor rod are electrically connected to a voltage detection unit. In this way, in a process of the pan-tilt head rotating relative to the pan-tilt base, the conductor rod cuts magnetic induction lines of the detection magnetic field and generates an induced electromotive force. In addition, in the embodiments of this application, the induced electromotive force on the two ends of (Continued)

the conductor rod can be detected through the voltage detection unit. It can be understood that the induced electromotive force is directly proportional to a rotation angular velocity of the conductor rod, that is, is directly proportional to a rotation angular velocity of the pan-tilt head, so that the rotation angular velocity of the pan-tilt head can be obtained, and a technical problem that an existing pan-tilt cannot measure a rotation speed is resolved, wherein the structure is simple and easy to implement, and is convenient to use.

14 Claims, 3 Drawing Sheets

(58) Field of Classification Search
USPC .......................................................... 324/164
See application file for complete search history.

(56) References Cited

U.S. PATENT DOCUMENTS

2017/0198747 A1* 7/2017 Chen .................. F16M 11/2064
2023/0326397 A1* 10/2023 Lee .......................... G09G 3/32
345/30

FOREIGN PATENT DOCUMENTS

| | | | | |
|---|---|---|---|---|
| CN | 108199539 A | | 6/2018 | |
| CN | 108427407 A | | 8/2018 | |
| CN | 108873946 A | * | 11/2018 | G05D 3/12 |
| CN | 109489696 A | | 3/2019 | |
| CN | 111142580 A | | 5/2020 | |
| CN | 113791646 A | | 12/2021 | |
| CN | 115373432 A | | 11/2022 | |
| JP | 2017215404 A | | 12/2017 | |
| WO | 2022021092 A1 | | 2/2022 | |
| WO | WO-2022041009 A1 | * | 3/2022 | F16M 11/121 |

OTHER PUBLICATIONS

"Spherical Cow" Wikipedia article at https://en.wikipedia.org/w/index.php?title=Spherical_cow&oldid=1027052828, dated Jun. 5, 2021 (Year: 2021).*

* cited by examiner

PAN-TILT, METHOD FOR CONTROLLING PAN-TILT, AND PHOTOGRAPHING APPARATUS

CROSS-REFERENCE TO RELATED APPLICATIONS

This application is a national stage of International Application No. PCT/CN2023/116070, filed on Aug. 31, 2023, which is based on and claims priority to Chinese Patent Application No. 202211077749.7 filed on Sep. 5, 2022, wherein the entire disclosures of both of the aforementioned applications are hereby incorporated by reference in their entireties.

TECHNICAL FIELD

The present disclosure relates to the field of pan-tilt technologies, and in particular, to a pan-tilt, a method for controlling a pan-tilt, and a photographing apparatus.

BACKGROUND

A pan-tilt is a general term of mechanical transmission and is widely used in the field of information acquisition such as image shooting, photographing, and monitoring. Generally, a pan-tilt is formed by a pan-tilt base and a pan-tilt head that are rotatably connected. A driving motor, for example, a stepper motor, is arranged in the pan-tilt base, and the stepper motor drives the pan-tilt head to rotate relative to the pan-tilt base, to adjust an information acquisition direction of an information acquisition device fixed on the pan-tilt head. In this way, the pan-tilt can adjust an information acquisition range of the information acquisition device as required in real time.

SUMMARY

In the related art, a rotation angle of a pan-tilt head relative to a pan-tilt base is mostly roughly estimated according to a quantity of steps of a stepper motor. In addition, an out-of-step phenomenon can easily occur in the stepper motor, which causes relatively poor calculation precision of the rotation angle, and an over-rotation case can easily occur. In addition, a related pan-tilt cannot obtain a rotation speed of the pan-tilt head.

In other words, the related pan-tilt has relatively poor precision for measurement of the rotation angle and the rotation speed of the pan-tilt head or cannot measure the rotation angle and the rotation speed of the pan-tilt head, which brings inconvenience to use.

For at least one aspect of the foregoing technical problems, some embodiments of this application provide a pan-tilt, a method for controlling a pan-tilt, and a photographing apparatus. A magnetic-field generating apparatus for generating uniform detection magnetic field is mounted on a pan-tilt base of the pan-tilt, a conductor rod is mounted on a pan-tilt head of the pan-tilt, and two ends of the conductor rod are electrically connected to a voltage detection unit. In this way, in a process of the pan-tilt head rotating relative to the pan-tilt base, the conductor rod cuts magnetic induction lines of the detection magnetic field and generates an induced electromotive force. In addition, in some embodiments, the induced electromotive force on the two ends of the conductor rod can be detected through the voltage detection unit. It can be understood that the induced electromotive force is directly proportional to a rotation angular velocity of the conductor rod, that is, is directly proportional to a rotation angular velocity of the pan-tilt head, so that the rotation angular velocity of the pan-tilt head can be obtained, and the technical problem that the related pan-tilt cannot measure the rotation speed is resolved, and the structure is simple, easy to implement, and convenient to use.

According to a first aspect, some embodiments of this application provide a pan-tilt, comprising:

- a pan-tilt base;
- a pan-tilt head, rotatably connected to the pan-tilt base through a rotating shaft;
- a magnetic-field generating apparatus, fixedly mounted on the pan-tilt base, where the magnetic-field generating apparatus generates a uniformly distributed detection magnetic field on a side facing the pan-tilt head; and
- a conductor rod, fixedly mounted on the pan-tilt head and rotatable with the pan-tilt head relative to the pan-tilt base,
- wherein the conductor rod is located on a side of the rotating shaft and extends in a radial direction of the rotating shaft, so that when rotating with the pan-tilt head relative to the pan-tilt base, the conductor rod is configured to cut magnetic induction lines of the detection magnetic field; and
- two ends of the conductor rod are electrically connected to a voltage detection unit, and the voltage detection unit is configured to detect an induced electromotive force on the two ends of the conductor rod.

In some embodiments, the magnetic induction lines of the detection magnetic field are parallel to the rotating shaft: the pan-tilt base is provided with a conductive layer on an end surface facing the pan-tilt head: a first end of the conductor rod close to the rotating shaft abuts against the conductive layer through a first conductive unit, and a second end of the conductor rod away from the rotating shaft abuts against the conductive layer through a second conductive unit, so that the conductor rod, the first conductive unit, the conductive layer, and the second conductive unit form a detection loop:

- wherein both the first conductive unit and the second conductive unit are parallel to the rotating shaft, and any one of the first conductive unit, the second conductive unit, or the conductor rod is connected in series to a detection resistor; and
- wherein the pan-tilt further comprises;
- a charge detection unit, where the charge detection unit and the detection resistor are connected in parallel to the detection loop.

In some embodiments, the first conductive unit abuts against the conductive layer through a first contact, and the second conductive unit abuts against the conductive layer through a second contact.

In some embodiments, the detection loop further comprises a current detection unit, and the current detection unit and the detection resistor are connected in series in the detection loop.

In some embodiments, the detection magnetic field is an annular magnetic field surrounding the rotating shaft, and the two ends of the conductor rod respectively extend out of the annular magnetic field.

In some embodiments, the first end of the conductor rod close to the rotating shaft extends to the rotating shaft, the rotating shaft is hollow, and the first conductive unit is arranged inside the rotating shaft.

In some embodiments, the pan-tilt further comprises:

a control unit, where the control unit is respectively electrically connected to the charge detection unit and the voltage detection unit;

wherein the control unit is configured to calculate a rotation angular velocity of the pan-tilt head according to a voltage detection value of the voltage detection unit, and the control unit is configured to calculate a rotation angle of the pan-tilt head according to a charge detection value of the charge detection unit.

In some embodiments, the pan-tilt further comprises:

a driving unit mounted on the pan-tilt base, wherein the driving unit is configured to drive the pan-tilt head to rotate through the rotating shaft;

wherein the driving unit is electrically connected to the control unit, the control unit is configured to control an output shaft rotation speed of the driving unit according to the voltage detection value, and the control unit is configured to control an output shaft rotation angle of the driving unit according to the charge detection value.

In some embodiments, the pan-tilt further comprises:

a calibration unit, where the calibration unit is electrically connected to the control unit;

wherein after receiving a calibration signal of the calibration unit, the control unit returns the rotation angle to zero.

In some embodiments, the magnetic-field generating apparatus is a magnet or an electromagnet.

According to a second aspect, some embodiments of this application provide a method for controlling a pan-tilt, the control method comprising:

obtaining a voltage detection value of a voltage detection unit;

calculating a rotation angular velocity of a pan-tilt head according to the voltage detection value; and controlling an output shaft rotation speed of a driving unit according to the rotation angular velocity.

In some embodiments, the control method further comprises:

obtaining a charge detection value of a charge detection unit;

calculating a rotation angle of the pan-tilt head according to the charge detection value; and controlling an output shaft rotation angle of the driving unit according to the rotation angle.

In some embodiments, the control method further comprises:

after receiving a calibration signal of a calibration unit, returning the rotation angle to zero.

According to a third aspect, some embodiments of this application provide a photographing apparatus, comprising a photographing device and a photographing pan-tilt for carrying the photographing device, wherein the photographing pan-tilt is the foregoing pan-tilt.

One or more technical solutions according to some embodiments of this application have at least the following technical effects or advantages.

In some embodiments of this application, a pan-tilt comprises a pan-tilt base and a pan-tilt head that are rotatably connected through a rotating shaft. A magnetic-field generating apparatus is mounted on the pan-tilt base, and the magnetic-field generating apparatus generates a detection magnetic field facing the pan-tilt head. A conductor rod is fixedly mounted on the pan-tilt head, and the conductor rod is located on a side of the rotating shaft and extends in a radial direction of the rotating shaft. It can be understood that in a process of the pan-tilt head rotating relative to the pan-tilt base, the conductor rod rotates with the pan-tilt head relative to the detection magnetic field, so that the conductor rod cuts magnetic induction lines of the detection magnetic field and generates an induced electromotive force. It can be reasoned that the induced electromotive force is directly proportional to a rotation angular velocity of the conductor rod, that is, is directly proportional to a rotation angular velocity of the pan-tilt head. Therefore, in some embodiments, two ends of the conductor rod are further electrically connected to a voltage detection unit, and in this way, the rotation angular velocity of the conductor rod can be obtained by detecting the induced electromotive force on the conductor rod, that is, the rotation angular velocity of the pan-tilt head can be obtained.

In other words, for the technical problem that the stepper motor of the related pan-tilt cannot obtain the rotation speed of the pan-tilt, in some embodiments of this application, creatively, the detection magnetic field is arranged on the pan-tilt base while the conductor rod is arranged on the pan-tilt head, so that on the basis of the rotation of the pan-tilt head relative to the pan-tilt base, the rotation angular velocity of the pan-tilt head is skillfully correlated with the conveniently measured induced electromotive force on the conductor rod. In this way, the rotation angular velocity of the pan-tilt head can be learned by measurement of the induced electromotive force, the structure is simple and is easy to implement, and detection precision is relatively high, which resolves the technical problem that the related pan-tilt in which the stepper motor is mounted cannot learn the rotation speed, so that the pan-tilt can be accurately, efficiently and quickly controlled and convenient to use.

In addition, due to a structure limitation, the related pan-tilt cannot rotate 360 degrees, that is, the entire circle: for example, the related pan-tilt can rotate only from 0 degrees to 359 degrees. In this case, if the related pan-tilt needs to rotate from a 350-degree position to a 0-degree position, the related pan-tilt needs to rotate reversely by a relatively large angle, increasing a rotation time and causing relatively low efficiency. However, in this application, without the structure limitation, the pan-tilt can continue to rotate across the 0-degree position, with relatively high efficiency.

BRIEF DESCRIPTION OF THE DRAWINGS

To describe the technical solutions in the embodiments of the present disclosure more clearly, the following briefly describes the accompanying drawings required for describing the embodiments of the present disclosure: apparently, the accompanying drawings in the following description show merely some embodiments of the present disclosure, and a person of ordinary skill in the art may still derive other drawings from these accompanying drawings without creative efforts.

Figures 1, 2:
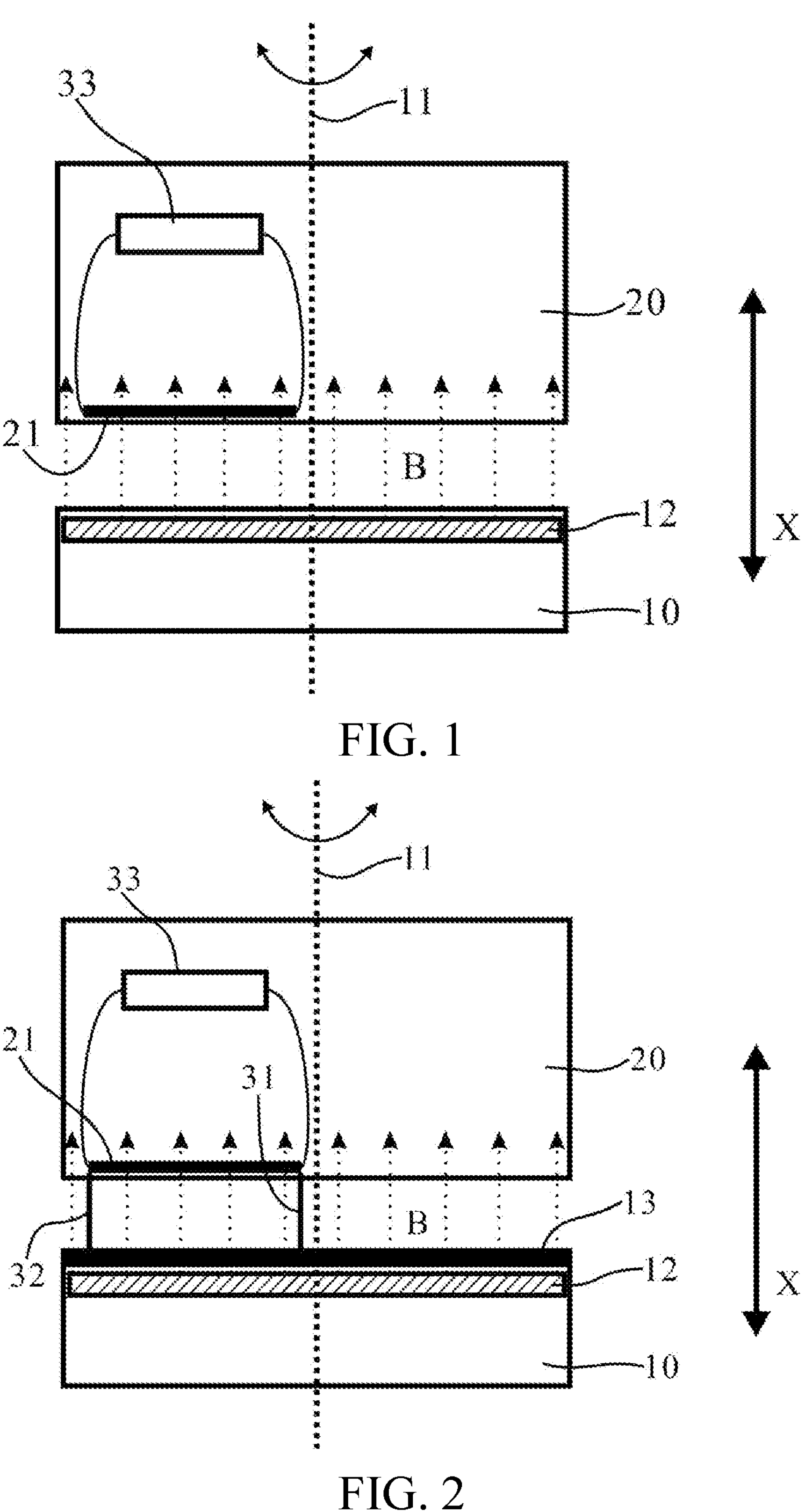
FIG. 1 is a schematic structural diagram of the pan-tilt according to some embodiments of this application.
FIG. 2 is a schematic structural diagram of the first conductive unit and the second conductive unit according to some embodiments of this application.

Wherein reference numerals are:

10—pan-tilt base, 11—rotating shaft, 12—magnetic-field generating apparatus, 13—conductive layer, 14—driving unit,

20—pan-tilt head, 21—conductor rod,

30—detection loop, 31—first conductive unit, 32—second conductive unit, 33—voltage detection unit, 34—charge detection unit, 35—detection resistor,

40—control unit,

50—calibration unit, and

X—first direction.

DETAILED DESCRIPTION

In order to better understand the above technical solutions, exemplary embodiments of this application will be described in more details below with reference to the accompanying drawings. Apparently, the described embodiments are a part rather than all of the embodiments of this application. It should be understood that this application is not limited by the described exemplary embodiments.

A pan-tilt is a general term of mechanical transmission and is widely used in the field of cameras. A pan-tilt camera can adjust a photographing angle thereof, to implement flexible and multi-angle monitoring.

In consideration of costs, a related pan-tilt camera is controlled mostly by using a stepper motor, and the stepper motor cannot obtain a position or a rotation speed of the pan-tilt. For example, a most current method is to roughly estimate a rotation angle of the pan-tilt by using a quantity of steps of the stepper motor. In addition, there is further an out-of-step phenomenon in movement of the stepper motor, and there is a return difference when a rotation direction changes, and these all cause low count precision of the quantity of steps of the stepper motor and a slow rotation speed because the stepper motor does not know a specific position and state of the pan-tilt, which makes it easy to over rotate.

Therefore, a closed-loop pan-tilt driving system with high precision and a reasonable price can greatly improve timeliness and precision of a product.

For the case, some embodiments of this application provide a pan-tilt, a method for controlling a pan-tilt, and a photographing apparatus. Wherein in some embodiments, both a magnetic-field generating apparatus and a conductor rod are integrated on the pan-tilt, and the pan-tilt is set such that in a process of a pan-tilt head rotating relative to a pan-tilt base, the conductor rod can rotate with the pan-tilt head and cut magnetic induction lines of a detection magnetic field generated by the magnetic-field generating apparatus. In this way, rotation of the pan-tilt head is correlated with an induced electromotive force on the conductor rod, and the induced electromotive force can be easily measured through a voltage detection unit, so that a rotation angular velocity of the pan-tilt head can be accurately learned in a process of the pan-tilt head rotating. Therefore, timeliness and measurement precision of the pan-tilt can be greatly improved.

FIG. 1 is a schematic structural diagram of a pan-tilt. With reference to FIG. 1 which shows a pan-tilt, the pan-tilt comprising a pan-tilt base 10, a pan-tilt head 20, a magnetic-field generating apparatus 12, and a conductor rod 21. The pan-tilt head 20 is rotatably connected to the pan-tilt base 10 through a rotating shaft 11. The magnetic-field generating apparatus 12 is fixedly mounted on the pan-tilt base 10, and the magnetic-field generating apparatus 12 generates a uniformly distributed detection magnetic field on a side facing the pan-tilt head 20. The conductor rod 21 is fixedly mounted on the pan-tilt head 20 and rotates with the pan-tilt head 20 relative to the pan-tilt base 10. Wherein the conductor rod 21 is located on a side of the rotating shaft 11 and extends in a radial direction of the rotating shaft 11, so that when rotating with the pan-tilt head 20 relative to the pan-tilt base 10, the conductor rod 21 is configured to cut magnetic induction lines of the detection magnetic field. In addition, two ends of the conductor rod 21 are electrically connected to a voltage detection unit 33, and the voltage detection unit 33 is configured to detect an induced electromotive force on the two ends of the conductor rod 21.

Wherein the pan-tilt base is rotatably connected to the pan-tilt head through the rotating shaft, and the rotating shaft is arranged in, for example, a first direction X. The pan-tilt head is configured to mount a photographing apparatus such as a camera. In a process of the pan-tilt head rotating relative to the pan-tilt base, the camera and the like rotate with the pan-tilt head, so that the camera and the like can adjust a photographing angle thereof, to implement multi-angle photographing or monitoring as actually required, as well as other purposes.

Specifically, in one aspect, in some embodiments, a magnetic-field generating apparatus is mounted on the pan-tilt base, and the magnetic-field generating apparatus can generate a detection magnetic field on a side facing the pan-tilt head: in another aspect, in some embodiments, a conductor rod is mounted on the pan-tilt head, and the conductor rod can rotate with the pan-tilt head. In addition, with reference to FIG. 1, the conductor rod extends in a radial direction of the rotating shaft and the conductor rod is located on a side of the rotating shaft. In other words, it can be understood that from a top view; the conductor rod does not pass through a center of the pan-tilt head (that is, the rotating shaft).

It can be understood that when the pan-tilt head rotates relative to the pan-tilt base, because the detection magnetic field is fixed relative to the pan-tilt base, the conductor rod cuts the magnetic induction lines of the detection magnetic field in the process of rotating with the pan-tilt head, so that an induced electromotive force is generated on the conductor rod according to the electromagnetic induction principle. Therefore, in some embodiments, two ends of the conductor rod are further electrically connected to a voltage detection unit, and the voltage detection unit is, for example, a voltmeter. The voltage detection unit can detect the induced electromotive force on the two ends of the conductor rod, so that a rotation angular velocity of the conductor rod, that is, a rotation angular velocity of the pan-tilt head, can be calculated.

It can be understood that through the foregoing arrangement, the rotation angular velocity of the pan-tilt head can be monitored in real time, that is, a rotation state of the pan-tilt head can be obtained in real time, thereby conveniently controlling and adjusting rotation of the pan-tilt as required.

In addition, it should be understood that the detection magnetic field generated by the magnetic-field generating apparatus should at least cover the conductor rod on the pan-tilt head, and the conductor rod may be arranged on, for example, an end surface of the pan-tilt head facing the pan-tilt base. In addition, considering detection precision, the voltage detection unit should be located outside the detection magnetic field, for example, arranged on an upper end part of the pan-tilt head.

It should be further understood that the induced electromotive force on the two ends of the conductor rod is directly proportional to the rotation angular velocity of the conductor rod (namely, the rotation angular velocity of the pan-tilt head), wherein details are shown in the following formula reasoning.

In some embodiments of this application, the pan-tilt comprises a pan-tilt base and a pan-tilt head that are rotatably connected through a rotating shaft, wherein a magnetic-field generating apparatus is mounted on the pan-tilt base, and the magnetic-field generating apparatus generates a detection magnetic field facing the pan-tilt head. A conductor rod is fixedly mounted on the pan-tilt head, and the conductor rod is located on a side of the rotating shaft and extends in a radial direction of the rotating shaft. It can be understood that in a process of the pan-tilt head rotating relative to the pan-tilt base, the conductor rod rotates with the pan-tilt head relative to the detection magnetic field, so that the conductor rod cuts magnetic induction lines of the detection magnetic field and generates an induced electromotive force. It can be reasoned that the induced electromotive force is directly proportional to a rotation angular velocity of the conductor rod, that is, is directly proportional to a rotation angular velocity of the pan-tilt head. Therefore, in some embodiments, two ends of the conductor rod are further electrically connected to a voltage detection unit, and in this way, the rotation angular velocity of the conductor rod can be obtained by detecting the induced electromotive force on the conductor rod, that is, the rotation angular velocity of the pan-tilt head can be obtained.

In other words, for the technical problem that the stepper motor of the related pan-tilt cannot obtain the rotation speed of the pan-tilt, in some embodiments, creatively, the detection magnetic field is arranged on the pan-tilt base and the conductor rod is arranged on the pan-tilt head, so that on the basis of the rotation of the pan-tilt head relative to the pan-tilt base, the rotation angular velocity of the pan-tilt head is skillfully correlated with the conveniently measured induced electromotive force on the conductor rod. In this way, the rotation angular velocity of the pan-tilt head can be learned by measurement of the induced electromotive force, the structure is simple and is easy to implement, and detection precision is relatively high, which resolves the technical problem that the related pan-tilt in which the stepper motor is mounted cannot learn the rotation speed, so that the pan-tilt can be accurately, efficiently and quickly controlled and convenient to use.

In some possible implementations, the magnetic induction lines of the detection magnetic field are parallel to the rotating shaft 11: the pan-tilt base 10 is provided with a conductive layer 13 on an end surface facing the pan-tilt head 20; a first end of the conductor rod 21 close to the rotating shaft 11 abuts against the conductive layer 13 through a first conductive unit 31, and a second end of the conductor rod 21 away from the rotating shaft 11 abuts against the conductive layer 13 through a second conductive unit 32, so that the conductor rod 21, the first conductive unit 31, the conductive layer 13, and the second conductive unit 32 form a detection loop 30; wherein both the first conductive unit 31 and the second conductive unit 32 are parallel to the rotating shaft 11: any one of the first conductive unit 31, the second conductive unit 32, or the conductor rod 21 is connected in series to a detection resistor 35: wherein the pan-tilt further comprises a charge detection unit 34, wherein the charge detection unit 34 and the detection resistor 35 are connected in parallel to the detection loop 30.

Referring to FIG. 2, in general, on the basis that the conductor rod cuts the magnetic induction lines and generates the induced electromotive force, in some embodiments, the two ends of the conductor rod are electrically connected to construct a detection loop, wherein a detection resistor is connected in series in the detection loop, and a charge detection unit is further connected in parallel to the detection resistor. In this way, it can be reasoned that a rotation angle of the conductor rod, that is, a rotation angle of the pan-tilt head, can be learned by detecting a cumulative charge flowing through the detection resistor.

To ensure precision, with reference to FIG. 2, only the conductor rod cuts the magnetic induction line. In one aspect, in some embodiments, the magnetic induction lines of the detection magnetic field are parallel to the rotating shaft, and both the first conductive unit and the second conductive unit are parallel to the rotating shaft in the process of rotating with the pan-tilt head. In this way, in the process of the pan-tilt head rotating, neither the first conductive unit nor the second conductive unit cuts the magnetic induction lines and generates the induced electromotive force.

Figures 3, 4:
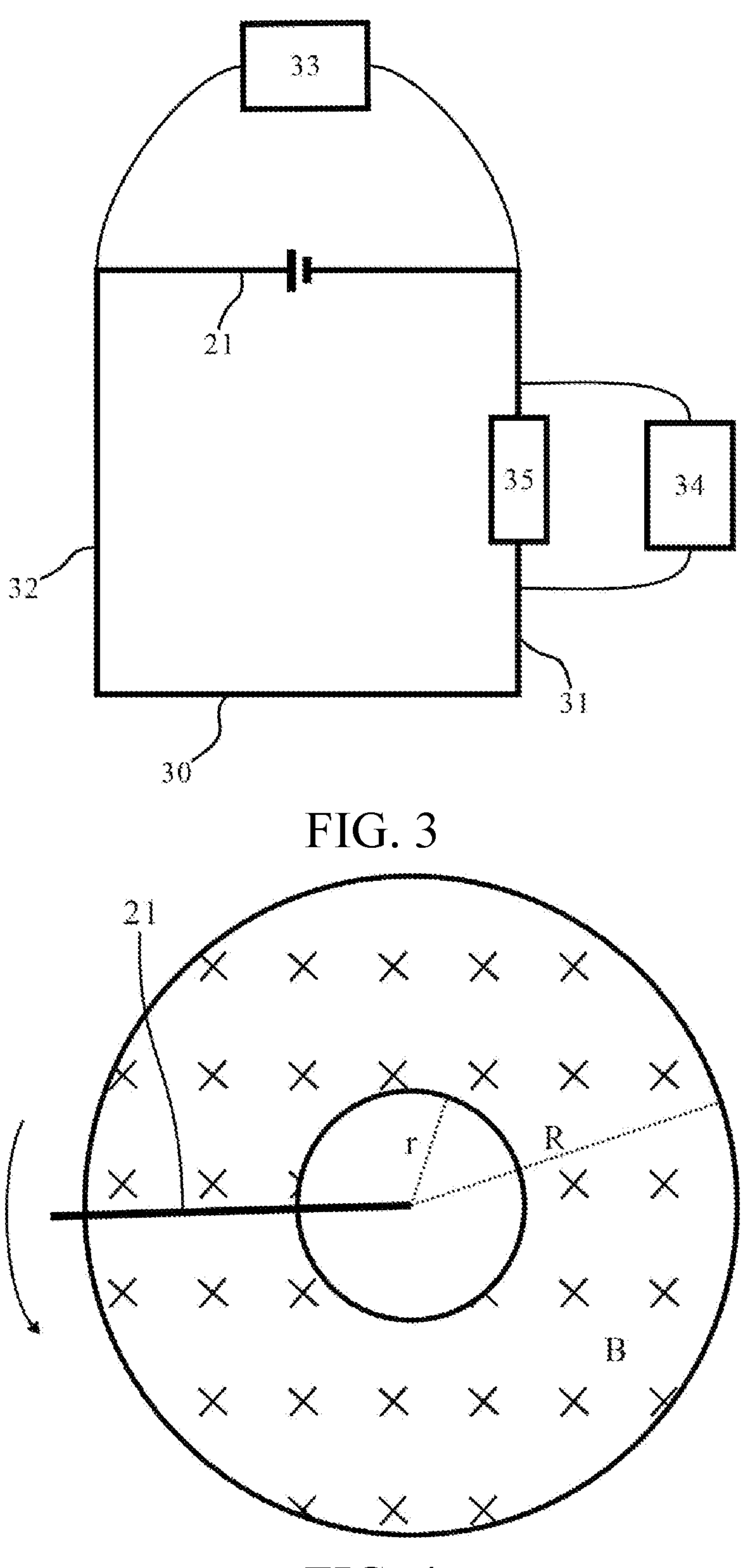
FIG. 3 is a diagram of an equivalent circuit in FIG. 2.
FIG. 4 is a schematic structural bottom view in which the detection magnetic field is an annular magnetic field according to some embodiments of this application.

Still with reference to FIG. 2 and FIG. 3, in another aspect, in some embodiments, a conductive layer is arranged on an end surface of the pan-tilt base facing the pan-tilt head, and the two ends of the conductor rod abut against the conductive layer respectively through the first conductive unit and the second conductive unit. It can be understood that the foregoing abutting may be implemented, for example, through a conductive elastic member. In this way, in the process of the two conductive units rotating with the pan-tilt head, it can be always ensured that the above-mentioned detection loop is formed, that is, an induced current flows through the detection resistor, so that an induced charged can be detected. In addition, the entire end surface of the pan-tilt base can be set to a conductive layer so that it can be ensured that an equivalent wire between the two conductive units does not cut the magnetic induction lines to generate an induced electromotive force opposite to that on the conductor rod.

In other words, in some embodiments, the two ends of the conductor rod respectively extend with two conductive units, wherein the two conductive units are parallel to the rotating shaft and rotate with the pan-tilt head, and then the two conductive units abut against the conductive layer on the pan-tilt base. In this way, during rotation, in one aspect, the two conductive units do not cut the magnetic induction lines to generate an induced electromotive force, and in another aspect, two abutment points between the two conductive units and the conductive layer also rotate with the pan-tilt head, so that it can be always ensured that the detection loop is conducted, and an equivalent wire on the conductive layer does not cut the magnetic induction lines to generate an opposite induced electromotive force.

In conclusion, in some embodiments, a detection loop comprising a conductor rod is arranged, and it is ensured that only the conductor rod cuts the magnetic induction lines during rotation, so that an induced charge in the detection loop can be detected through the charge detection unit connected in parallel to the detection resistor, and thus a rotation angle of the pan-tilt head can be calculated, thereby the pan-tilt can be accurately, efficiently and quickly controlled and convenient to use.

It should be further understood that a charge detection value obtained by the charge detection unit is directly proportional to a rotation angle of the conductor rod (namely, the rotation angle of the pan-tilt head), wherein details are shown in the following formula reasoning.

In some embodiments, the first conductive unit 31 abuts against the conductive layer 13 through a first contact, and the second conductive unit 32 abuts against the conductive layer 13 through a second contact.

Specifically, the first contact and the second contact are, for example, metal balls that are arranged on end portions of the conductive units and can freely rotate, which facilitates rotation with the pan-tilt head and reduces resistance during rotation. Further, an elastic body such as a spring may be further arranged between the conductive unit and the metal ball, to ensure full electrical connection.

In some embodiments, the detection loop further comprises a current detection unit, and the current detection unit and the detection resistor are connected in series in the detection loop.

The current detection unit is, for example, an ammeter. The induced electromotive force can also be calculated by combining readings of the ammeter and a resistance value of the detection resistor. In this way, reliability of the induced electromotive force result can be ensured through double detection of the voltage detection unit and the current detection unit.

In some possible implementations, the detection magnetic field is an annular magnetic field surrounding the rotating shaft 11, and the two ends of the conductor rod 21 respectively extend out of the annular magnetic field.

That is, consider a deviation phenomenon that may occur after the two conductive units are used for a long time, wherein the deviation phenomenon is a phenomenon that the two conductive units are not parallel to the rotating shaft due to long-time rotation, causing the two conductive units to cut the magnetic induction lines.

In some embodiments, the detection magnetic field may be set to an annular magnetic field, and the two ends of the conductor rod respectively extend out of the annular magnetic field, so that a possibility that the deviation phenomenon occurred in the two conductive units cause the two conductive units to cut the magnetic induction lines can be greatly reduced, thereby ensuring precision.

Specifically, the first end of the conductor rod 21 close to the rotating shaft 11 extends to the rotating shaft 11, the rotating shaft 11 is hollow, and the first conductive unit 31 is arranged inside the rotating shaft 11. In this way, by arranging the first conductive unit inside the rotating shaft, it can be ensured that the deviation phenomenon does not occur in at least the first conductive unit, and the structure is simple and easy to implement.

Based on the above-mentioned annular magnetic field, "the induced electromotive force on the two ends of the conductor rod is directly proportional to the rotation angular velocity of the conductor rod" and "the charge detection value is directly proportional to the rotation angle of the conductor rod" mentioned above are derived in detail below.

First, in the process of the pan-tilt head rotating, only the conductor rod cuts the magnetic induction lines, that is, only a magnetic flux of an area swept by the conductor rod changes, and thus the conductor rod generates an induced electromotive force E. A total induced electromotive force generated on the conductor rod is:

$$E = \Delta\varphi/\Delta t \quad \text{formula 1}$$

In formula 1, E is the induced electromotive force on the conductor rod, and Δφ represents a magnetic flux of an area swept by the conductor rod within Δt.

There is another formula:

$$\Delta\varphi = B * \Delta S \quad \text{formula 2}$$

In formula 2, B represents magnetic induction intensity of the annular magnetic field, and ΔS is an area swept by the conductor rod in the detection magnetic field.

The conductor rod cuts the annular magnetic field, and there is another formula:

$$\Delta S = \pi(R^2 - r^2) * (\Delta\theta/2\pi) = (R^2 - r^2) * \Delta\theta/2 \quad \text{formula 3}$$

Wherein in formula 3, with reference to FIG. 4, r represents an inner diameter of the annular magnetic field, R represents an outer diameter of the annular magnetic field, and Δθ is an angle of rotation of the conductor rod with time Δt.

It may be obtained by combining and differentiating the foregoing formula 1 to formula 3 that:

$$E(t) = 0.5 * B * (R^2 - r^2) * d\theta/dt \quad \text{formula 4}$$

In addition, because $$\omega(t) = d\theta/dt \quad \text{formula 5}$$

It may be obtained by combining the foregoing formula 4 and formula 5 that:

$$E(t) = 0.5 * B * (R^2 - r^2) * \omega(t) \quad \text{formula 6}$$

It may be obtained by transforming formula (6) that:

$$\omega(t) = 2 * E(t)/[B * (R^2 - r^2)] \quad \text{formula 7}$$

It can be learned through formula 7 that the induced electromotive force E on the two ends of the conductor rod is directly proportional to a rotation angular velocity ω of the conductor rod. In addition, at any moment, the rotation angular velocity of the conductor rod, that is, the rotation angular velocity of the pan-tilt head, can be calculated by measurement of the induced electromotive force on the conductor rod through the voltage detection unit.

In addition, integrating on two sides of formula 6, that is, $$\int_0^T E(t) = \int_0^T 0.5 * B * (R^2 - r^2) * \omega(t),$$

to obtain:

$$\theta(t)=\int_0^t \omega(t)=\frac{2}{B*(R^2-r^2)}*\int_0^t E(t) \quad \text{formula 8}$$

In formula 8, θ(t) represents an angle by which the conductor rod rotates from the beginning to a moment t.

Because the charge detection unit is connected in parallel to the detection resistor, the charge detection unit can detect a cumulative charge flowing through the detection resistor from the beginning to the moment t, and there is a formula:

$$E(t)=Z*I(t) \quad \text{formula 9}$$

Wherein in formula 9, Z represents a resistance value of the detection resistor, and I represents a current flowing through the detection resistor.

It may be obtained by combining formula 8 and formula 9 that:

$$\theta(t)=\frac{2Z}{B*(R^2-r^2)}*\int_0^t I(t)=\frac{2ZQ(t)}{B*(R^2-r^2)} \quad \text{formula 10}$$

In formula 10, Q(t) represents a charge detection value detected by the charge detection unit from the beginning to the moment t. It can be understood that the charge detection value represents the cumulative charge from the beginning to the moment t.

It can be learned through formula 10 that the charge detection value Q is directly proportional to a rotation angle θ of the conductor rod. In addition, at any moment, the rotation angle of the conductor rod, that is, the rotation angle of the pan-tilt head, can be calculated by measurement of the detection resistor through the charge detection unit.

Specifically, the charge detection unit may be, for example, a coulomb counter, wherein the coulomb counter is a high-precision device, and detection precision of the coulomb counter on a charge can reach 1%.

It can be learned through the foregoing formula 7 and formula 10 that the rotation angular velocity of the pan-tilt head can be calculated through real-time readings E(t) of the voltage detection unit, and the rotation angle of the pan-tilt head can be calculated through real-time readings Q(t) of the charge detection unit.

For determining a rotation direction of the pan-tilt head, the foregoing formula 7 represents the rotation angular velocity of the pan-tilt head at any moment, and a direction of the pan-tilt head is reflected as a positive value or a negative value in the formula. Rotations in different directions are reflected as opposite directions of the induced electromotive force and the induced current in the detection loop, with a positive value and a negative value respectively refer to different directions.

In some possible implementations, the pan-tilt further comprises a control unit 40, wherein the control unit 40 is respectively electrically connected to the charge detection unit 34 and the voltage detection unit 33. Wherein the control unit 40 is configured to calculate a rotation angular velocity of the pan-tilt head 20 according to a voltage detection value of the voltage detection unit 33, and the control unit 40 is configured to calculate a rotation angle of the pan-tilt head 20 according to a charge detection value of the charge detection unit 34.

That is, after receiving the voltage detection value of the voltage detection unit, the control unit calculates the rotation angular velocity of the pan-tilt head through the foregoing formula 7. Wherein the voltage detection value is the induced electromotive force E on the two ends of the conductor rod. After receiving the charge detection value of the charge detection unit, the control unit calculates the rotation angle of the pan-tilt head through the foregoing formula 10, so that the rotation angular velocity and the rotation angle of the pan-tilt head can be monitored in real time.

In some embodiments, the pan-tilt further comprises a driving unit 14. The driving unit 14 is mounted on the pan-tilt base 10, and is configured to drive the pan-tilt head 20 to rotate through the rotating shaft 11. Wherein the driving unit 14 is electrically connected to the control unit 40, the control unit 40 is configured to control an output shaft rotation speed of the driving unit 14 according to the voltage detection value, and the control unit 40 is configured to control an output shaft rotation angle of the driving unit 14 according to the charge detection value.

That is, after obtaining the real-time rotation angular velocity and rotation angle of the pan-tilt head, the control unit can further control the driving unit according to an actual requirement, to regulate rotation of the pan-tilt head as required. For example, a proportional-integral-derivative (PID) algorithm may be integrated in the control unit, and the PID algorithm may be used for performing real-time adjustment according to a speed and a position of the pan-tilt head, quickly starting the pan-tilt head, and enabling the pan-tilt head to quickly and accurately reach a predetermined position. Alternatively, the PID algorithm may be used for planning an entire motion path of the pan-tilt head in advance, and performing real-time control, which can resolve a defect that the conventional stepper motor-controlled pan-tilt cannot move at a high speed.

In some possible implementations, the pan-tilt further comprises a calibration unit 50, wherein the calibration unit 50 is electrically connected to the control unit 40. After receiving a calibration signal of the calibration unit 50, the control unit 40 returns the rotation angle to zero.

In some embodiments, considering that the rotation angle of the pan-tilt head is obtained through integral calculation, there may be an integral error. In addition, in the definite integral formula, calculation starts from a position of 0 point and a moment 0, and thus a start position and a start moment need to be provided so that this formula is correct. Based on the two points, in some embodiments, a calibration unit is added, that is, a 0-point position is added in a process of the pan-tilt head rotating relative to the pan-tilt base. When the conductor rod passes through the position, it is marked as a moment 0, and calculation of the previous rotation angle is set to zero. In this way, the pan-tilt system can perform regular calibration and regular zero out, to ensure accuracy of data.

For example, the calibration unit is an optocoupler or a photoelectric sensor, and comprises a first calibration member and a second calibration member, wherein the first calibration member is fixedly mounted on the pan-tilt base, and the second calibration member is fixedly mounted on the pan-tilt head. In this way, upon the pan-tilt head rotates each circle, the two calibration members coincide and interact with each other, and the control unit receives a calibration signal and thus returns the rotation angle to zero.

In some possible implementations, the magnetic-field generating apparatus 12 may be a magnet or an electromagnet.

Figures 5, 6:
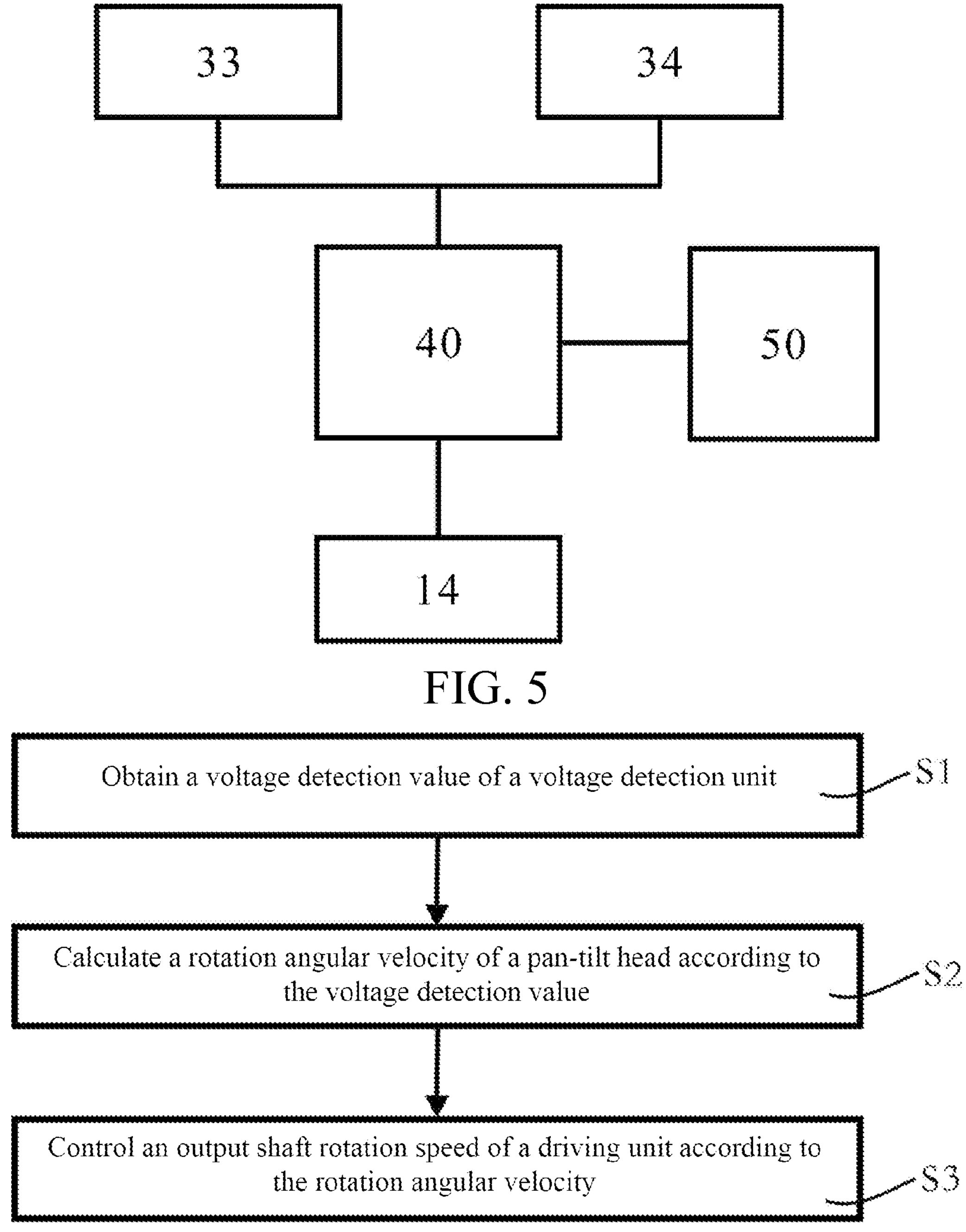
FIG. 5 is a schematic diagram of a circuit connection relationship of the control unit according to some embodiments of this application.
FIG. 6 is a schematic flowchart of a method for controlling the pan-tilt according to some embodiments of this application.

Based on the foregoing pan-tilt, this application further discloses a method for controlling a pan-tilt: with reference to FIG. 6, the control method comprise:

S1: obtaining a voltage detection value of a voltage detection unit;

S2: calculating a rotation angular velocity of a pan-tilt head according to the voltage detection value;

S3: controlling an output shaft rotation speed of a driving unit according to the rotation angular velocity.

In some embodiments, the control method further comprises:

S4: obtaining a charge detection value of a charge detection unit;

S5: calculating a rotation angle of the pan-tilt head according to the charge detection value;

S6: controlling an output shaft rotation angle of the driving unit according to the rotation angle.

In some embodiments, the control method further comprises:

S7: after receiving a calibration signal of a calibration unit, returning the rotation angle to zero.

Based on the above-mentioned pan-tilt, this application further discloses a photographing apparatus comprising a photographing device and a photographing pan-tilt for carrying the photographing device, wherein the photographing pan-tilt is the above-mentioned pan-tilt.

The above describes basic principles of this application with reference to specific embodiments, however, it should be noted that the advantages, strengths, effects, and the like mentioned in this application are merely examples but not limitations, and these advantages, strengths, effects, and the like cannot be considered to be necessary for each embodiment of this application. In addition, the specific details disclosed above are only for illustrative purposes and easy-to-understand functions rather than limitation, and the above details do not limit this application for implementation with the above specific details.

The block diagrams of the device, apparatus, equipment, and system involved in this application are merely illustrative examples and are not intended to require or imply that the device, apparatus, equipment, and system need to be connected, arranged, or configured in the manner shown in the block diagrams. Those skilled in the art realize that the device, apparatus, equipment, and system can be connected, arranged, and configured in any manner. Terms such as "comprise", "include", "have", and the like are open terms that mean "comprising but not limited to" and may be used interchangeably with it. The terms "or" and "and" used herein refer to the term "and/or" and may be used interchangeably with it, unless the context clearly dictates otherwise. The expression "such as" used herein refers to the phrase "such as but not limited to" and may be used interchangeably with it.

It should further be noted that in the apparatus, device, and method of this application, the components or steps may be decomposed and/or recombined. These decompositions and/or recombinations shall be regarded as equivalent solutions of this application.

The above description of the disclosed aspects is provided to enable a person skilled in the art to make or use this application. Various modifications to these aspects are very clear to those skilled in the art, and the general principles defined herein can be applied to other aspects without departing from the scope of this application. Therefore, this application is not intended to be limited to the aspects shown herein but in accordance with the widest scope consistent with the principles and novel features disclosed herein.

The above description has been given for the purposes of illustration and description. In addition, this description is not intended to limit the embodiments of this application to the form disclosed herein. Although a plurality of example aspects and embodiments have been discussed above, a person skilled in the art realizes that some variations, modifications, changes, additions, and sub-combinations thereof shall fall within the protection scope of the present disclosure.

What is claimed is:

1. A pan-tilt, comprising:

a pan-tilt base;

a pan-tilt head, rotatably connected to the pan-tilt base through a rotating shaft;

a magnetic-field generating apparatus, fixedly mounted on the pan-tilt base, wherein the magnetic-field generating apparatus is configured to generate a uniformly distributed detection magnetic field on a side facing the pan-tilt head; and a conductor rod, fixedly mounted on the pan-tilt head and rotatable with the pan-tilt head relative to the pan-tilt base, wherein the conductor rod is located on a side of the rotating shaft and is capable of extending in a radial direction of the rotating shaft, so that when rotating with the pan-tilt head relative to the pan-tilt base, the conductor rod is configured to cut magnetic induction lines of the detection magnetic field; and two ends of the conductor rod are electrically connected to a voltage detection unit, and the voltage detection unit is configured to detect an induced electromotive force on the two ends of the conductor rod.

2. The pan-tilt according to claim 1, wherein the magnetic induction lines of the detection magnetic field are parallel to the rotating shaft; the pan-tilt base is provided with a conductive layer on an end surface facing the pan-tilt head; a first end of the conductor rod close to the rotating shaft abuts against the conductive layer through a first conductive unit, and a second end of the conductor rod away from the rotating shaft abuts against the conductive layer through a second conductive unit, so that the conductor rod, the first conductive unit, the conductive layer, and the second conductive unit are capable of forming a detection loop;

wherein both the first conductive unit and the second conductive unit are parallel to the rotating shaft, and any one of the first conductive unit, the second conductive unit, or the conductor rod is connected in series to a detection resistor; and wherein the pan-tilt further comprises:

a charge detection unit, wherein the charge detection unit and the detection resistor are connected in parallel to the detection loop.

3. The pan-tilt according to claim 2, wherein the first conductive unit abuts against the conductive layer through a first contact, and the second conductive unit abuts against the conductive layer through a second contact.

4. The pan-tilt according to claim 2, wherein the detection loop further comprises a current detection unit, and the current detection unit and the detection resistor are connected in series in the detection loop.

5. The pan-tilt according to claim 2, wherein the detection magnetic field is an annular magnetic field surrounding the rotating shaft, and the two ends of the conductor rod respectively extend out of the annular magnetic field.

6. The pan-tilt according to claim 5, wherein the first end of the conductor rod close to the rotating shaft extends to the rotating shaft, the rotating shaft is hollow, and the first conductive unit is arranged inside the rotating shaft.

7. The pan-tilt according to claim 2, wherein the pan-tilt further comprises:

a control unit respectively electrically connected to the charge detection unit and the voltage detection unit, wherein the control unit is configured to calculate a rotation angular velocity of the pan-tilt head according to a voltage detection value of the voltage detection unit, and the control unit is configured to calculate a rotation angle of the pan-tilt head according to a charge detection value of the charge detection unit.

8. The pan-tilt according to claim 7, wherein the pan-tilt further comprises:

a driving unit mounted on the pan-tilt base and configured to drive the pan-tilt head to rotate through the rotating shaft;

wherein the driving unit is electrically connected to the control unit, the control unit is configured to control an output shaft rotation speed of the driving unit according to the voltage detection value, and the control unit is configured to control an output shaft rotation angle of the driving unit according to the charge detection value.

9. The pan-tilt according to claim 7, wherein the pan-tilt further comprises:

a calibration unit electrically connected to the control unit;

wherein after receiving a calibration signal of the calibration unit, the control unit returns the rotation angle to zero.

10. The pan-tilt according to claim 1, wherein the magnetic-field generating apparatus is a magnet or an electromagnet.

11. A method for controlling a pan-tilt, wherein the method is applied to the pan-tilt according to claim 1, and the method comprises:

obtaining a voltage detection value of a voltage detection unit;

calculating a rotation angular velocity of a pan-tilt head according to the voltage detection value; and controlling an output shaft rotation speed of a driving unit according to the rotation angular velocity.

12. The control method according to claim 11, further comprising:

obtaining a charge detection value of a charge detection unit;

calculating a rotation angle of the pan-tilt head according to the charge detection value; and controlling an output shaft rotation angle of the driving unit according to the rotation angle.

13. The control method according to claim 12, further comprising:

after receiving a calibration signal of a calibration unit, returning the rotation angle to zero.

14. A photographing apparatus, comprising a photographing device and a photographing pan-tilt for carrying the photographing device, wherein the photographing pan-tilt is the pan-tilt according to claim 1.

* * * * *